US009405858B2

(12) United States Patent
Attaluri et al.

(10) Patent No.: US 9,405,858 B2
(45) Date of Patent: Aug. 2, 2016

(54) ON-THE-FLY ENCODING METHOD FOR EFFICIENT GROUPING AND AGGREGATION

(71) Applicant: International Business Machines Corporation, Armonk, NY (US)

(72) Inventors: Gopi K. Attaluri, San Jose, CA (US); Ronald J. Barber, San Jose, CA (US); Vincent Kulandaisamy, Portland, OR (US); Sam S. Lightstone, Toronto (CA); Guy M. Lohman, San Jose, CA (US); Ippokratis Pandis, Palo Alto, CA (US); Vijayshankar Raman, Sunnyvale, CA (US); Richard S. Sidle, Mountain View, CA (US); Liping Zhang, Portland, CA (US); Naresh Chainani, Portland, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 14/070,990

(22) Filed: Nov. 4, 2013

(65) Prior Publication Data

US 2014/0372470 A1 Dec. 18, 2014

Related U.S. Application Data

(63) Continuation of application No. 13/918,302, filed on Jun. 14, 2013.

(51) Int. Cl.
*G06F 17/30* (2006.01)
(52) U.S. Cl.
CPC .... *G06F 17/30979* (2013.01); *G06F 17/30398* (2013.01)

(58) Field of Classification Search
CPC ............... G06F 17/30979; G06F 17/30398
USPC .......................................... 707/722
See application file for complete search history.

(56) References Cited

U.S. PATENT DOCUMENTS

| 5,598,559 A | 1/1997 | Chaudhuri |
| 5,893,086 A | 4/1999 | Schmuck et al. |
| 5,930,785 A * | 7/1999 | Lohman ............ G06F 17/30466 |
| 6,026,394 A | 2/2000 | Tsuchida et al. |

(Continued)

OTHER PUBLICATIONS

Yan, Weipeng P. et al., "Performing Group-By before Join [query processing]," Proceedings 10th International Conference on Data Engineering, 1994, pp. 1-30, IEEE, 1994.

(Continued)

*Primary Examiner* — Hosain Alam
*Assistant Examiner* — Robert F May
(74) *Attorney, Agent, or Firm* — Cantor Colburn LLP; Bryan Butler

(57) ABSTRACT

Embodiments include a system for encoding data while it is being processed. The system includes a processor, an encoder and a decoder. The processor is configured to process a query request by determining a set of values. The encoder is configured for encoding the set of values, such that a subsequent processing operation can be performed on the encoded values. The processor performs the subsequent processing operations. The decoder is configured for decoding each value back to its value prior to being encoded upon completion of the processor completing the requested query.

13 Claims, 4 Drawing Sheets

(56) References Cited

U.S. PATENT DOCUMENTS

| | | |
|---|---|---|
| 6,505,189 B1 | 1/2003 | On Au et al. |
| 6,609,131 B1 | 8/2003 | Zait et al. |
| 6,757,677 B2 | 6/2004 | Pham et al. |
| 6,775,681 B1 | 8/2004 | Ballamkonda et al. |
| 6,941,432 B2 | 9/2005 | Ronstrom |
| 6,954,776 B1 | 10/2005 | Cruanes et al. |
| 7,062,481 B2 | 6/2006 | Pham et al. |
| 7,343,363 B1 | 3/2008 | Parker |
| 7,499,960 B2 | 3/2009 | Dageville et al. |
| 7,653,670 B2 | 1/2010 | Hasan et al. |
| 7,827,182 B1 | 11/2010 | Panigrahy |
| 7,827,218 B1 | 11/2010 | Mittal |
| 8,145,642 B2 | 3/2012 | Cruanes et al. |
| 8,195,644 B2 | 6/2012 | Xu |
| 8,271,564 B2 | 9/2012 | Dade |
| 8,321,385 B2 | 11/2012 | Burroughs et al. |
| 8,370,316 B2 | 2/2013 | Bensberg et al. |
| 8,438,574 B1 | 5/2013 | Lyle et al. |
| 8,768,927 B2 | 7/2014 | Yoon et al. |
| 2002/0016820 A1* | 2/2002 | Du Val ............... H04N 7/17318 709/203 |
| 2004/0260684 A1 | 12/2004 | Agrawal et al. |
| 2005/0018683 A1 | 1/2005 | Zhao et al. |
| 2005/0033741 A1 | 2/2005 | Dombroski et al. |
| 2007/0136317 A1 | 6/2007 | Przywara |
| 2007/0244850 A1 | 10/2007 | Hoppe et al. |
| 2007/0245119 A1 | 10/2007 | Hoppe |
| 2008/0126706 A1 | 5/2008 | Newport et al. |
| 2008/0133583 A1 | 6/2008 | Artan et al. |
| 2008/0162402 A1* | 7/2008 | Holmes ............... G06F 21/6227 |
| 2009/0006399 A1 | 1/2009 | Raman et al. |
| 2009/0024568 A1 | 1/2009 | Al-Omari et al. |
| 2009/0210445 A1 | 8/2009 | Draese et al. |
| 2009/0222659 A1 | 9/2009 | Miyabayashi et al. |
| 2010/0088309 A1* | 4/2010 | Petculescu ......... G06F 17/3048 707/714 |
| 2010/0114868 A1* | 5/2010 | Beavin ............... G06F 17/30463 707/718 |
| 2010/0131540 A1 | 5/2010 | Xu |
| 2010/0223253 A1* | 9/2010 | Gopal ............... G06F 17/30306 707/713 |
| 2011/0060876 A1 | 3/2011 | Liu |
| 2011/0066593 A1 | 3/2011 | Ahluwalia et al. |
| 2011/0078134 A1* | 3/2011 | Bendel ............... G06F 17/30312 707/713 |
| 2011/0283082 A1 | 11/2011 | Mckenney et al. |
| 2012/0011108 A1 | 1/2012 | Bensberg et al. |
| 2012/0011133 A1 | 1/2012 | Faerber et al. |
| 2012/0011144 A1 | 1/2012 | Transier et al. |
| 2012/0036134 A1 | 2/2012 | Malakhov |
| 2012/0117055 A1 | 5/2012 | Al-Omari et al. |
| 2012/0136846 A1 | 5/2012 | Song et al. |
| 2012/0136889 A1 | 5/2012 | Jagannathan et al. |
| 2012/0143877 A1 | 6/2012 | Kumar et al. |
| 2012/0158729 A1 | 6/2012 | Mital et al. |
| 2012/0166400 A1 | 6/2012 | Sinclair et al. |
| 2012/0173517 A1* | 7/2012 | Lang ............... G06F 17/30498 707/722 |
| 2012/0260349 A1 | 10/2012 | Nagai et al. |
| 2012/0303633 A1 | 11/2012 | He et al. |
| 2012/0310917 A1 | 12/2012 | Sheinin et al. |
| 2013/0138628 A1 | 5/2013 | Bensbert et al. |
| 2013/0218934 A1 | 8/2013 | Lin et al. |
| 2014/0006379 A1 | 1/2014 | Arndt et al. |
| 2014/0025648 A1 | 1/2014 | Corbett et al. |
| 2014/0074819 A1* | 3/2014 | Idicula ............... G06F 17/30289 707/719 |
| 2014/0108489 A1 | 4/2014 | Glines et al. |
| 2014/0129568 A1 | 5/2014 | Kim et al. |
| 2014/0214794 A1 | 7/2014 | Attaluri et al. |
| 2014/0214795 A1* | 7/2014 | Attaluri ............ G06F 17/30498 707/714 |
| 2014/0214855 A1 | 7/2014 | Attaluri et al. |
| 2014/0215019 A1 | 7/2014 | Ahrens |
| 2014/0372388 A1 | 12/2014 | Attaluri et al. |
| 2014/0372392 A1 | 12/2014 | Attaluri et al. |
| 2014/0372407 A1 | 12/2014 | Attaluri et al. |

OTHER PUBLICATIONS

Attaluri et al., U.S. Appl. No. 13/753,740 "Reducing Collisions Within a Hash Table" filed Jan. 30, 2013, 50 pages.

Marek et al., "TID Hash Joins," CIKM, 1994, pp. 42-29.

U.S. Appl. No. 13/918,302; Non-Final Office Action; Date Filed: Jun. 14, 2013; Date Mailed: Jun. 17, 2015; 33 pages.

Anonymous, "System and Method for Usage Aware Row Storage in Database Systems", IP.Com, Jul. 23, 2010, pp. 1-4.

Anonymous, "Efficient Grouping Over Joins of Compressed Tables", IP.com, Apr. 6, 2010, pp. 1-6.

Anonymous, "High Performance Technique Using Join Collocation in a Massively Parallel Processing Relational Database Implementation", IP.com, Jun. 14, 2012, pp. 1-5.

Anonymous, CashMap: Processor Cache-Aware Implementation of Hash Tables, IP.com, Jul. 5, 2013, pp. 1-7.

Attaiuri et al., U.S. Appl. No. 13/753,740, "Join Operation Partitioning", Filed Jan. 30, 2013; 51 pages.

Attaluri et al., U.S. Appl. No. 13/755,784, "Dynamically Determining Join Order", Filed Jan. 31, 2013; 42 pages.

Chang, Shih-Fu, "Recent Advances of Compact Hasing for Large-Scale Visual Search", Columbia University, Oct. 2012, pp. 1-44.

Cleary, John G., "Compact Hash Tables Using Bidirectional Linear Probing", IEEE Transactions on Computers, vol. C-33, No. 9, Sep. 1994, pp. 824-834.

Cutt et al., "Improviing Join Performance for Skewed Databases", IEEE, 2008, 5 pages.

Hu et al., "Rapid multi-demention hierarchical algorithm in data warehouse system", Computer Integrated Manufacturing Systems, Jan. 2007, pp. 196-201, vol. 13, No. 1 China [English-language translation: Abstract Only].

Hua, Nan, et al., "Rank-Indexed Hasing: A Compact Construction of Bloom Filters and Variants", IEEE, 2008, pp. 73-82.

Korn et al., "The VCDIFF Generic Differencing and Cojpression Data Format (RFC3284)", Network Working Group, IP.com, Jul. 1, 2002, pp. 1-31.

Li et al., "Adaptively Reordering Joins During Query Execution", IEEEE, 2007, pp. 26-35.

Mell et al., "The NIST Definition of Could Computing", National Institute of Standands and Technolgy Special Publication 800-145, Department of Commerce, Sep. 2011, pp. 1-7.

Raman et al., "DB2 with BLU Acceleration: So Much More than Just a Column Store", Proceedings of the VLDB Endowment, ACM, Aug. 2013, pp. 1-12, vol. 6, No. 11.

Spyros et al., "Design and Evaluation of Main Memory Hash Join Algorithms for Multi-core CPU's", SIGMOD Int'l Conference on Management of Data ACM, Jun. 12, 2011, pp. 1-12.

U.S. Appl. No. 13/537,745, "Efficient Partitioned Joins in a Database With Column-Major Layout", Filed Jun. 29, 2012, 41 pages.

U.S. Appl. No. 14/509,336, "Embracing and Exploiting Data Skew During a Join or Groupby", Filed Oct. 8, 2014, 38 pages.

Wang et al., "Investigating Memory Optimization of Hash-Index . . . Sequencing on Multi-Core Architecture", IPDPSW, IEEE 26th Inter. Conference on May 21-25, 2012, pp. 665-674.

Xu, Yang, "A Multi-Dimensional Progressive Perfect Hashing for High Speed String Matching", 2011 Seventh ACM/IEEE Symposium on Architectures for Networking and Communications Systems, pp. 167-177.

* cited by examiner

| Employee Name | Serial Number | Location |
|---|---|---|
| Joseph Abe | 2228765 | Endicott, NY |
| Gregory Barney | 1238756 | Poughkeepsie, NY |
| . | . | |
| . | . | |
| Lauren Zack | 7698022 | San Jose, CA |

Human Resource - Table 1

| Employee Name | Position | Salary |
|---|---|---|
| Joseph Abe | Floor Manager | $113,348 |
| Gregory Barney | Engineer | $50,000 |
| . | . | . |
| . | . | . |
| Lauren Zack | Engineer | $65,800 |

Human Resource - Table 2

Table 220

| Customer Name | City, States | Zip Code |
|---|---|---|
| Joan Abernathy | Brick, NJ | 07645 |
| Robert Best | San Jose, CA | 12366 |
| . | . | |
| . | . | |
| Ryan Zultana | Detroit, MI | 09834 |

Table 210

| Customer Name | Account Number |
|---|---|
| Joan Abernathy | 001-14522 |
| Robert Best | 012 – 35755 |
| . | |
| . | |
| Ryan Zultana | 002 – 76802 |

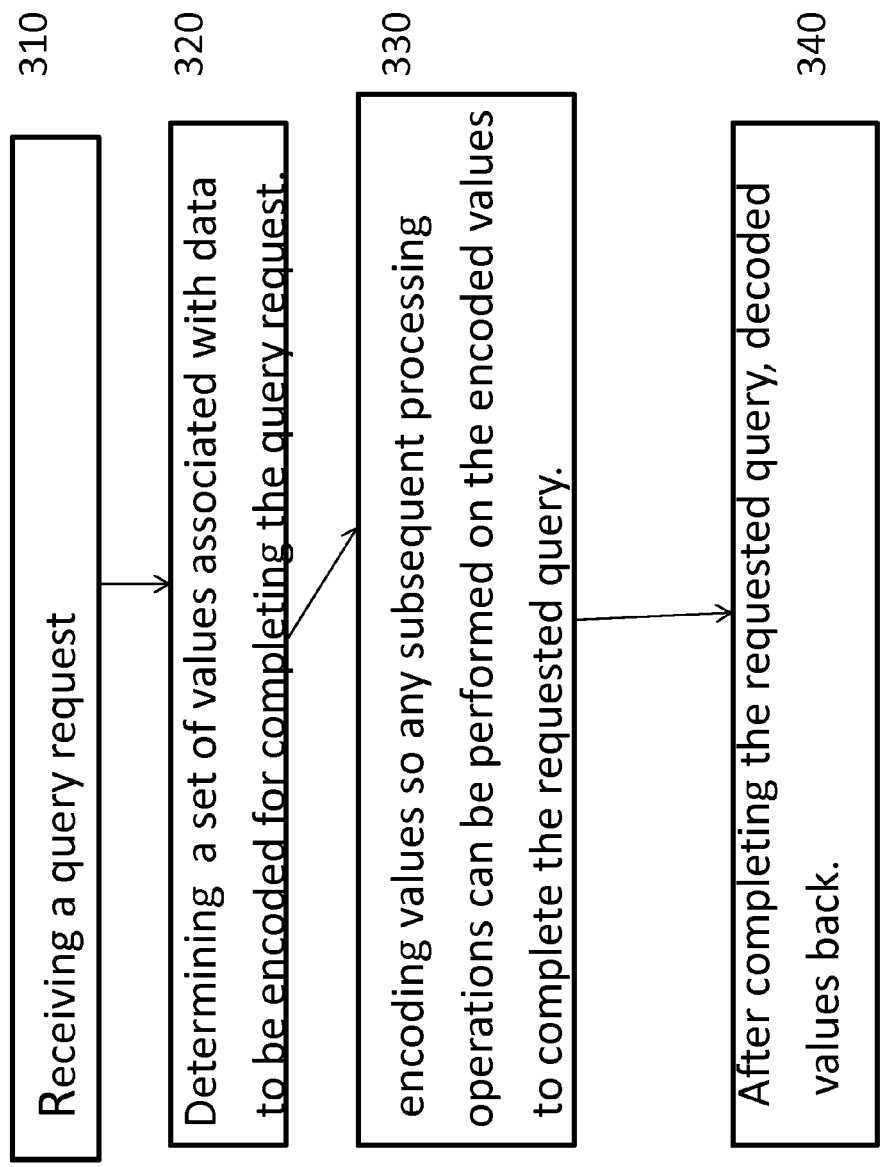

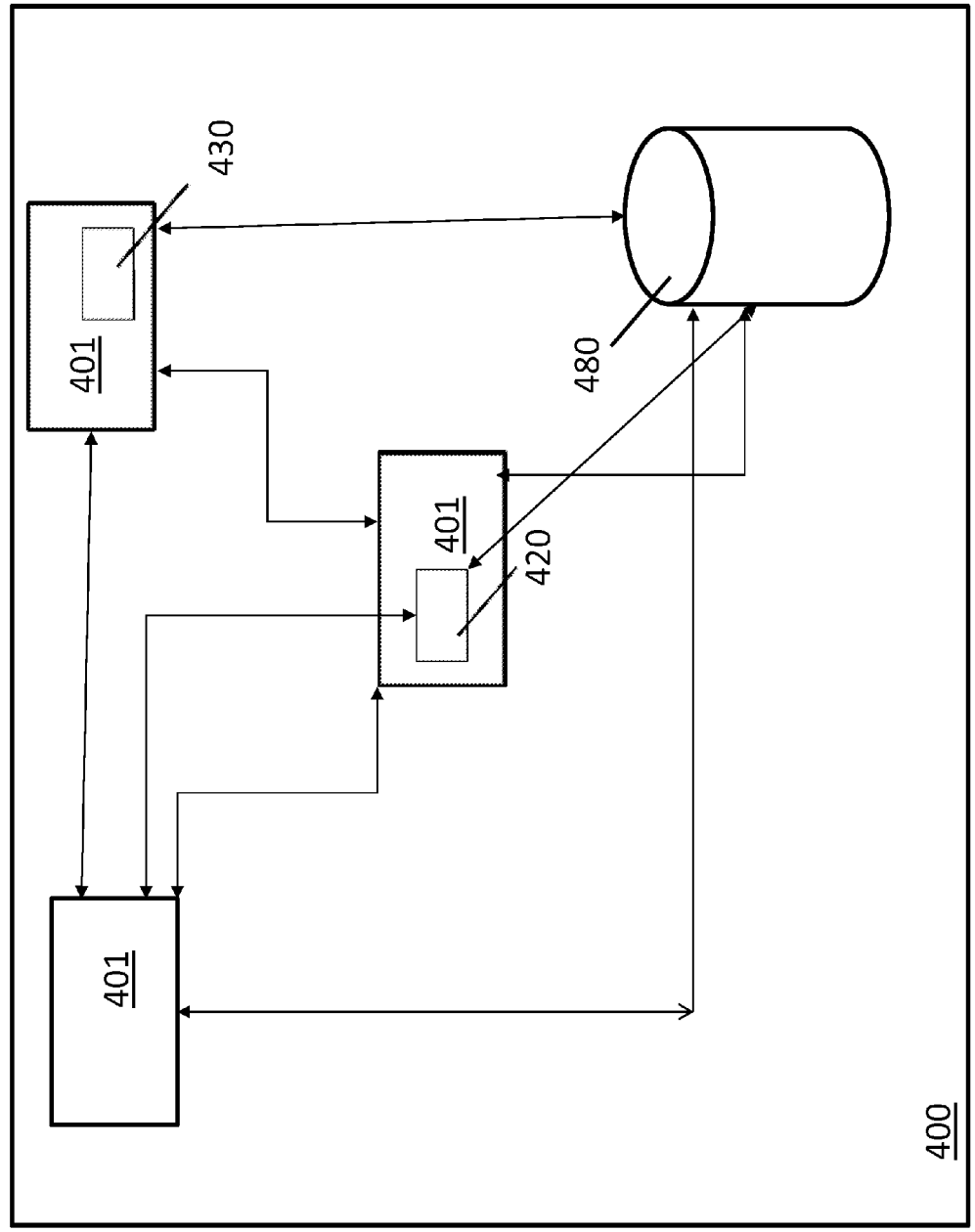

ON-THE-FLY ENCODING METHOD FOR EFFICIENT GROUPING AND AGGREGATION

CROSS REFERENCE TO RELATED APPLICATION

This application is a continuation of U.S. patent application Ser. No. 13/918,302, filed Jun. 14, 2013, the content of which is incorporated by reference herein in its entirety.

BACKGROUND

The present invention relates generally to relational databases, and more specifically to relational databases that perform aggregation during run-time operations.

A database is a collection of information organized in such a way that a computer program can quickly select desired pieces of data. It may be organized by fields, records, and files or through use of linking such as hypertext. In some embodiments, to access information from a database, a database management system (DBMS) is also used, which may include a collection of programs for organizing and storing data.

Many database tables are organized in a matrix type structure, that is, made of rows and columns. The intersection of a row with a column is defined as a cell that holds data. In many relational databases, a hash table is used. A hash table is a data structure used to implement an associative array which often can map keys to values. A hash table uses a hash function to compute an index into an array of buckets from which the correct value can be found. Ideally a hash function assigns each possible key to each bucket.

Management of today's relational databases, especially those that use hash tables, is complex. One reason is because data retrieval is performed by initiating a function that most often results in a query operation being performed. Therefore the ability to handle a large quantity of query operations at one time in a time efficient manner is necessary. Unfortunately, designing data management systems can be challenging because, while storage and operational footprint remains limited or is being actively reduced, the size of the databases keep growing. Under such conditions, performing runtime operations on these large databases with limited resources either requires additional cost or is time prohibitive.

SUMMARY

A system for encoding data while it is being processed includes a processor configured to process a query request by determining a set of values; an encoder for encoding the set of values such that a subsequent processing operation can be performed on the encoded values, the processor performing the subsequent processing operations; and a decoder for decoding each value back to its value prior to being encoded upon completion of the processor completing the requested query.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 1 depicts an example of a data tables that can be used in accordance with one embodiment of the present invention;

FIG. 2 depicts another example of a table that can be used in accordance with an embodiment;

FIG. 3 depicts a process flow for performing an aggregation operation in accordance with an embodiment; and FIG. 4 is a block diagram illustration of a computing environment as can be utilized in conjunction with different embodiments.

DETAILED DESCRIPTION

In computing environments, databases are a collection of stored data that is logically related. Many databases include one or more tables that can be related to one another. Each table is made up of a matrix of rows and columns. Each row represents an entry that can vary in the scope and nature of stored information it provides.

A relational database is a popular form of database used for data management. Many of these relational databases use hash tables to optimize time and operational resources. A standard database-query language is the structured query language, referenced as SQL. SQL is used often with relational databases that also utilize hash tables. In SQL, to retrieve data or update data included in the relational table, queries are used.

A popular database operation is an aggregation operation. Aggregation is an abstraction which turns a relationship between objects into an aggregate object, based on performing a grouping request. The group-by operation involved in aggregation often involves an associated join operation as well to establish the grouped objects as a consolidated result.

Besides data aggregation, join and group-by operation are also important operations. Group-by operation result in the actual groupings of one or more group of data as preselected by an aggregation request or query. Join operation can be performed to combine all groups into a single final desired list or document. The problem, however, with large databases is that group-by and join operations typically consume a lot of machine resources, and thus provide a challenge with limited footprints and other associated time constraints.

Columns used in group-by are typically categorical attributes that include long strings of data or data types (hereinafter wide), and group-by clause can have many columns. Also, these columns are usually accessed from dimension tables. In data warehousing, a dimension table contains descriptive attributes that are typically textual in nature and are used for query constraining and/or filtering. In both join and group-by operations, this increases the width of the hash table, sometimes forcing data storage to be spilled to other storage devices such as external disks. Consequently, where wide group-by tables are used, the operational structure causes slowdown in both join and group-by related operations.

In addition, in performing a join of multiple tables, the intermediate results are typically stored in a spool table. In some cases, the join of multiple tables (such as a cross-product join) can generate a large amount of data. As a result, a spool space problem may be encountered if the spool table becomes too big. Consequently, database system performance may suffer.

It is conceivable to reduce the width of the group-by columns by first running the group-by function on the foreign key column first and then do a join and finally end the operation by performing a second grouping on the dimension columns. This presents several problems, however. For example, performing the first grouping can be prohibitively expensive because there may be too many groups involved. This method may also not be applicable to some aggregate operations.

An alternative is using a group-by operation that uses encoded data in order to reduce the width. However, this method also presents its own set of problems. For example, one drawback of this method is that it does not work well on unencoded data or expressions. Therefore, other ways are needed to encode them, which is especially expensive in some multiprocessing environments such as those using a non-uniform memory access (NUMA) architecture.

FIG. 1 shows examples of illustrating a plurality of tables to be used in accordance with one embodiment. In FIG. 1 a first table 110 and a second table 120 are depicted each having multiple rows and columns. The entries of middle rows and columns (depicted by periods) are omitted for ease of illustration to show that just a few or a lengthy number of rows can be stored in a memory or accumulated during run-time.

The two illustrated tables of FIG. 1 are related to one another in that they both display information about employees of the MXZ company. Table 1 provides information about the employee name (column 112), serial number (column 114) and location (column 116), while Table 2 still identifies the employees (column 122) but also provide information about their positions (column 115) and salaries (column 117).

In one example, it may be desired to use a predicate on the result of a join operation about each employee that earns more than $50,000 annual salary in City A by position. Therefore, the available data will be searched by the preselected grouping and searched based on that grouping predicate. In this case, an employee's name, salary amount and location are considered as grouping predicates. In this case, accessing both tables is required, since salaries and work locations are in two different tables. Once the search is completed, the results are accumulated as a single document.

FIG. 2 provides another example showing a plurality of tables that can be used in accordance with one embodiment. In tables 210 and 220 of FIG. 2, information about customer names, account numbers, and their associated cities, states and zip codes are provided alongside with the amount of payment due for each customer.

In one example, a query is then requested that does a grouping on customer city, state and zip code. In this example, the overall group-by width may be 50 to 100 bytes long. However, the number of distinct groups will be less than 50000, suggesting that a limited binary code with a limited or compact length can suffice to encode the data to be accessed based upon the query's criteria. This encoding can both be used subsequently for joining and grouping as well. In this particular example, 2 bytes (16-bits) of transmission/storage space can suffice for the grouping code used in this example.

In one embodiment, an on-the-fly (OTF) coding is provided that can be used dynamically during runtime that can provide the suggested scheme as discussed in conjunction with FIG. 2. In such an embodiment, OTF coding can be provided to assign a compact encoding scheme having easy-to-manage codes. In one embodiment, to make the scheme even more efficient, the encoding scheme can be associated to the dimension payloads. The encoding and joining can occur during runtime. The scheme can have the codes cover only the actual values encountered after applying query predicates, and only for the valid combinations of the grouping columns encountered (so as to take advantage of correlation established). Consequently, both join and group-by performances are improved.

One example can now be used to make some of the presented concepts more clear. Suppose the query provides:

select . . . from Fact, Dim where . . . group by
Dim.A, Dim.B, Dim.C having . . . .

In one embodiment, a technique can be used that pushes the group-by and join operations so as to compute select uniqueId( ) from Dim group by A, B, C where (same predicates as in original query) to construct an encoding table for all the distinct groups. This is a group-by operation done not for computing/completing the aggregation process, but rather performed only to assign a unique code to each group combination. The unique code can be generated using the generate-unique or serial number functions. When the original query is performed during run-time operations, an extra join of the dimension is added with the result of the above group-by operation to convert A,B,C into encoded values. Subsequently, the join operation is completed (with the fact) and the grouping on the computed code is then performed such that even the having clause can be applied if desired. An alternative method that does not use a generate-unique or serial number function is to use some physical identifier associated with the records of Dim as the unique code. For instance, in many DBMSs each record of a table has a record identifier (RID). The RID of a characteristic record in each group can be used as the code for that group—e.g., instead of invoking generate_unique, compute the smallest or largest RID for the records in each group. Another variation that does not involve a separate group by query over Dim is to insert group values from Dim into a hash table as part of the regular query, and use a physical identifier from the hash table (e.g., the bucket offset in the hash table where a group value was inserted) as the unique code for that group.

In this example, the join operation can be performed to join with the lookup table that is computed above, to recapture the A, B, C values. This technique does not necessarily involve changes to the DBMS runtime, and it can be performed entirely via query rewrite operations in SQL. There is, however, a more efficient technique that modifies the DBMS runtime so that a faster lookup table can be implemented. For example, the query:

```
select from Fact, Dim Fact.fkey = Dim.key group by
Dim.A, Dim.B, Dim.C having
can be rewritten as
    with temp as select A,B,C, generate_ unique( ) as OTF_Code from
    Dim group by A,B,C
        ( select .. from Fact,
            (select Dim.key, temp.OTF_Code --- (1)
                from Dim, temp
                where Dim.a = temp.A and Dim.b = temp.B and
                Dim.C = temp.C
                and other local predicates on Dim from the original
                query )
        group by temp.OTF_Code
        having ...)
``` plus a final join with temp to get back the actual A,B,C values, if needed in the select clause. If the RID method is used, generate_unique will be replaced by min(RID) or max(RID) in the preceding SQL statement.

If other non-group by columns are also accessed from Dim, in this embodiment, they will also be part of the select clause in line (1). This can be used with other embodiments and arrangements. For example, in a snowflake query with multiple joins, this OTF code is computed separately for each subtree of the snowflake, to form an encoding for the grouping columns from that snowflake. As an optimization, it is possible to avoid this double scan of the dimension by doing an aggregation distinct during the dimension scan, with the distinct being on the key columns of the dimension (and non-group by columns from the dimension, if there are any). This allows the subsequent join with the fact to directly probe into the results of the aggregation distinct to access the join columns and not have to go back to scan the dimension table.

This scheme applies even when the grouping is done on expressions. For example, suppose one entry of the group-by clause is month(date). With OTF coding, a code that occupies only log(#distinct months) bits, which can be much smaller than the space taken up to store the full date or the unencoded string-valued month can be assigned. A scheme that just did group-by on encoded data would not have this benefit.

This scheme is particularly well suited to systems that lay out data in columnar format because the repeated dimension scans need only access the needed attributes. Furthermore, when the data is compressed with a global dictionary encoding, it can use the concatenation of the dictionary codes itself as the encoding for the group. However, if unencoded values are encountered, they need to be assigned a code by inserting those values into a hash table and essentially performing a group-by operation to assign the unique key, but only on unencoded grouping values.

FIG. 3 is an illustration of a flow diagram in accordance with one embodiment which depicts a technique for encoding data while it is being processed as part of a query. In blocks 310 and 320, upon receiving a query request, a set of values associated with data to be encoded for completing the query request is determined. This set of values may have been reduced by the earlier application of predicates, computation of expressions, or due to correlation among the values of different columns (such as city, state, and zip code). Proceeding to block, 330, these values are encoded such that any subsequent processing operations can be performed on the encoded values to complete the requested query. In block 340, after performing the subsequent processing operations to complete the requested query, each value is decoded back to its original value.

FIG. 4 is a block diagram illustration of a computing environment as per one embodiment of the present invention having a facilitated network system 400. As illustrated in FIG. 4, the system comprises a plurality of nodes 401 that are in processing communication with one another. This communication can be enabled through wired or wireless processing or other alternate means as can be appreciated by those skilled in the art. Each node 401 can also include one or more processors 430. Each node 401 can include its own internal memory as shown at 420, or be in processing communication with that node's internal memories, or in communication with one or more external memories such as the one shown in FIG. 4 at 480. The system memories 420 and 480 can also be in communication directly with one another or through the node and either be comprised of a single unit that is shared among the many nodes 201 or be comprised of a plurality of components that are in processing communication with one another. In this manner, each node 201 can either exclusively use a single memory or alternatively use multiple memories at the same time or at different times to achieve processing optimization. In one embodiment, one or nodes 401 or processors 430 can be used while in processing communication with one another one of the memories such as 420 or 480 to provide instructions for carrying out the techniques discussed above such as the processor identifying keys associated with values in a database.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for encoding data, the system comprising:
a processor configured to
    determine a first set of values for completing a query, the first set of values being associated with the data;
    reduce the first set of values, wherein reducing the first set of values comprises:
        a computing an expression;
        correlating a first un-encoded value in the first set of values to a second un-encoded value in the first set of values based at least in part on the expression;
        excluding the first un-encoded value from the first set of values to obtain the second set of values; and
    process a query during run-time by determining that the query includes a query predicate and evaluating the query predicate to determine that the query predicate excludes a third un-encoded value in the second set of values and does not exclude the second un-encoded value in the second set of values;
an encoder configured to encode, during run-time and subsequent to evaluating the query predicate, the second un-encoded value to obtain an encoded value;
the processor being further configured to complete the query at least in part by performing at least one processing operation on the encoded value during run-time; and
a decoder configured to decode the encoded value to obtain the second un-encoded value upon completion of the query.

2. The system of claim 1, wherein at least part of the data is retrieved from a plurality of tables stored in a relational database.

3. The system of claim 2, wherein the at least one processing operation is selected from the group consisting of a join operation and a grouping operation.

4. The system of claim 2, wherein the at least one processing operation includes a plurality of relational query processing operations.

5. The system of claim 1, wherein the second set of values is concatenated based on a plurality of attributes referenced in the query.

6. The system of claim 1, wherein the data includes data that is being transmitted dynamically during the execution of the query.

7. The system of claim 1, wherein the the encoder is configured to encode the second un-encoded value by determining that the second un-encoded value is a distinct value in the second set of values and assigning a distinct code to the second un-encoded value.

8. The system of claim 7, wherein the distinct code is provided by a function selected from the group consisting of a serial number function and a unique number generating function.

9. The system of claim 7, wherein the distinct code is generated using physical properties of a plurality of records containing the second un-encoded value.

10. The system of claim 9, wherein the physical properties include record identifiers of the plurality of records, and wherein the distinct code is a particular record identifier of a particular record of the plurality of records.

11. The system of claim 1, wherein at least one attribute of the data is stored and encoded using dictionary encoding.

12. The system of claim 11, wherein the at least one attribute includes a first attribute and a second attribute, and wherein the encoder is configured to encode a fourth un-encoded value in the second set of values by concatenating a first dictionary code of the first attribute and a second dictionary code of the second attribute.

13. The system of claim 1, wherein the encoder is configured to encode one or more un-encoded values in the second set of values by selecting a scheme optimal to the requested query.

* * * * *